T. M. FREEBLE.
TRAIN SIGNALING AND CONTROL SYSTEM.
APPLICATION FILED SEPT. 24, 1910.

1,171,332.

Patented Feb. 8, 1916.
3 SHEETS—SHEET 1.

WITNESSES
R A Balderson
W F Amariss

INVENTOR
Thos. M. Freeble,
by Bakewell, Byrnes & Parmelee,
his Attys

T. M. FREEBLE.
TRAIN SIGNALING AND CONTROL SYSTEM.
APPLICATION FILED SEPT. 24, 1910.
1,171,332.
Patented Feb. 8, 1916.
3 SHEETS—SHEET 2.
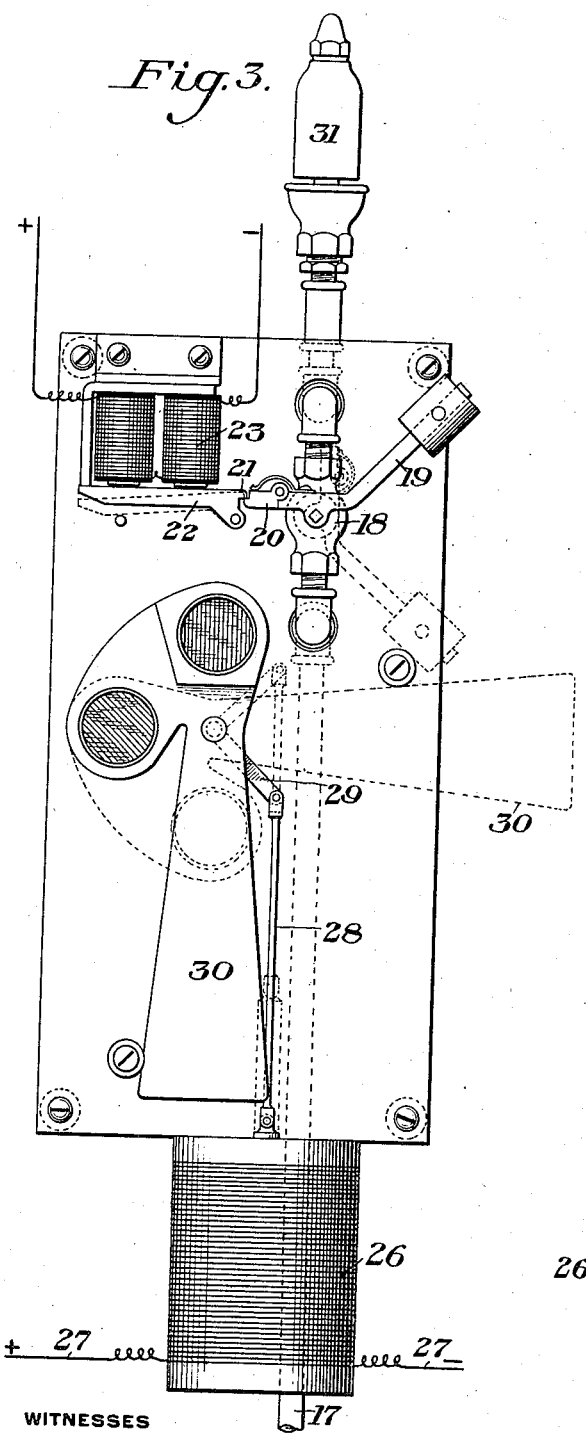
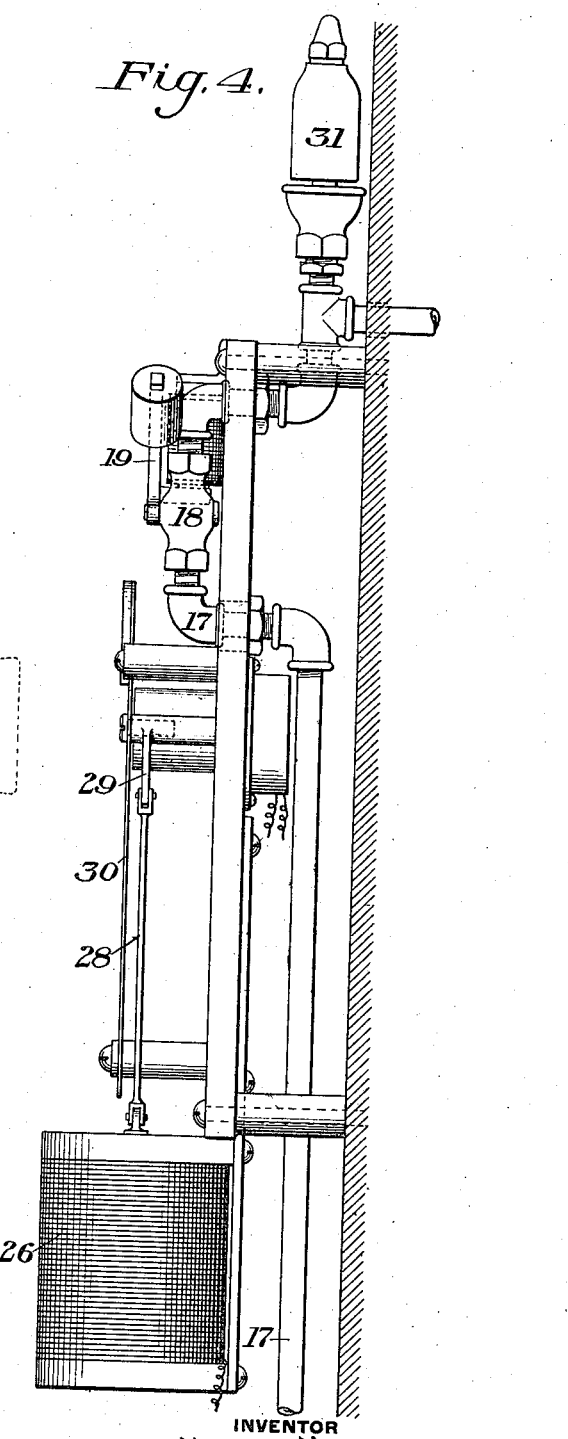

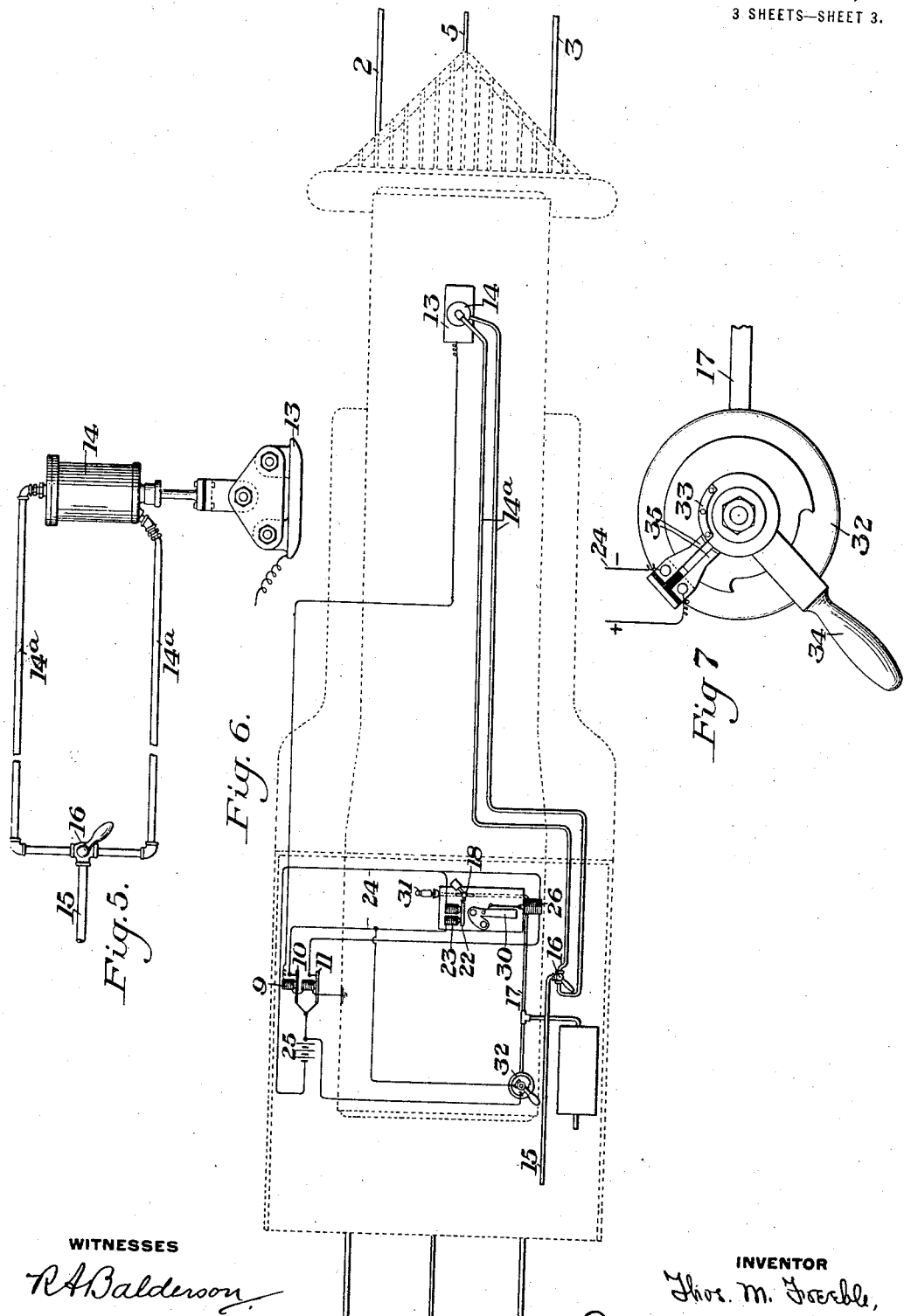

UNITED STATES PATENT OFFICE.

THOMAS M. FREEBLE, OF ROCHESTER, PENNSYLVANIA.

TRAIN SIGNALING AND CONTROL SYSTEM.

1,171,332.　　　　　Specification of Letters Patent.　　Patented Feb. 8, 1916.

Application filed September 24, 1910. Serial No. 583,573.

*To all whom it may concern:*

Be it known that I, THOMAS M. FREEBLE, of Rochester, Beaver county, Pennsylvania, have invented a new and useful Train Signaling and Control System, of which the following is a full, clear, and exact description, reference being had to the accompanying drawings, forming part of this specification, in which—

Figure 1:
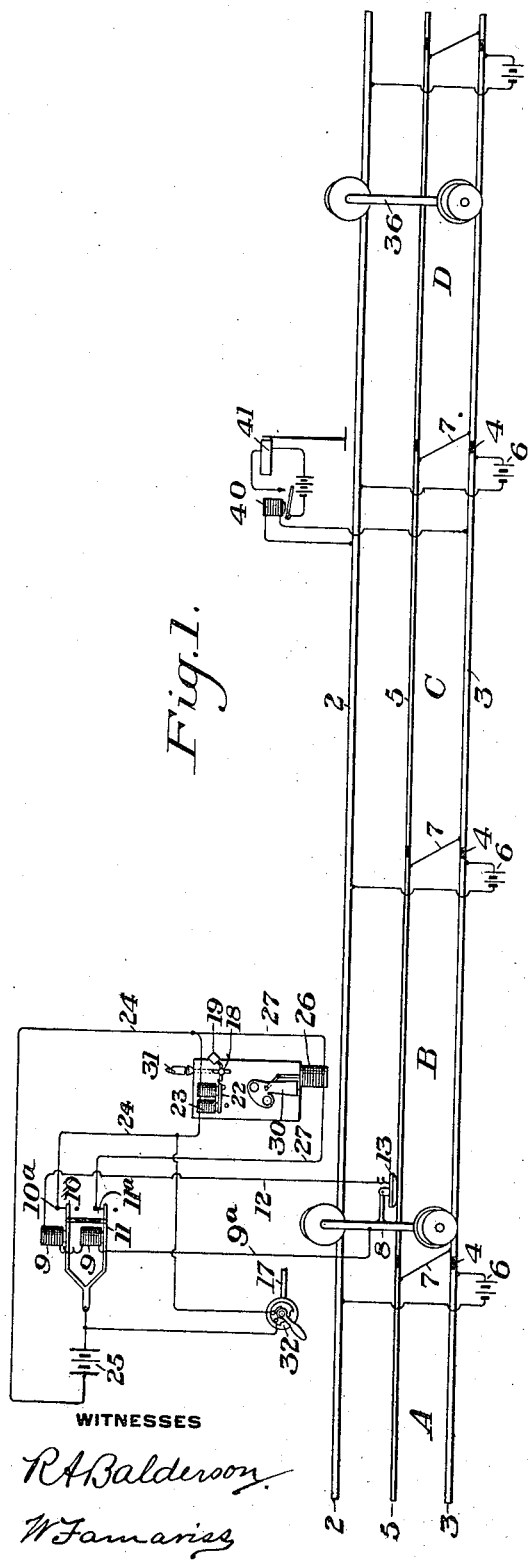
Figure 2:
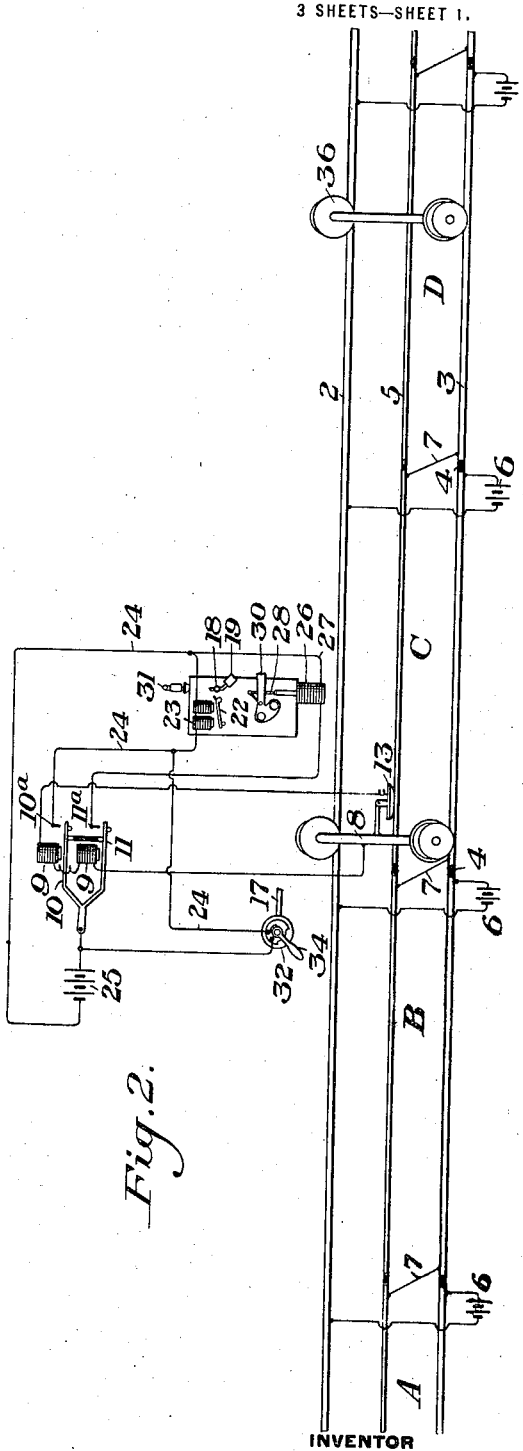

Figures 1 and 2 are diagram views of a system embodying my invention, the two views showing different conditions of the circuits; Fig. 3 is a front view of the signal control mechanism located on the cab; Fig. 4 is a side view of the same; Fig. 5 is a view largely diagrammatic showing one means for raising and lowering the contact shoe; Fig. 6 is a plan view illustrating the apparatus on the engine; and Fig. 7 is a detail view of the engineer's brake control switch.

My invention has relation to train signaling and control systems, and more particularly to that class of such systems in which the controlling and signaling apparatus is located on the cab of the engine, or upon some other part of the moving train or vehicle.

The object of my invention is to provide a system of this character, in which the actuating and controlling circuits shall be as simple as possible; which will require the use of a minimum amount of mechanism upon the moving vehicle, and which shall be automatic and positive in its operation; in which the parts are not likely to become out of order; and which can be installed and operated at a relatively low cost.

The precise nature of my invention will be best understood by reference to the accompanying drawings, which will now be described, it being premised, however, that various changes can be made in the details of construction, combination and arrangement of the various parts by those skilled in the art without departing from the spirit and scope of my invention as defined in the appended claims.

In these drawings the numerals 2 and 3 designate the track rails of a railway track. The rail 2 is preferably electrically continuous throughout, while the rail 3 is shown as being in insulated sections, the insulation being indicated at 4. 5 is a signal conductor, one section of this conductor being used in each of the blocks or sections A, B, C, D, etc., formed by the divisions of the track rails 3. These blocks or sections may be of any desired length. Each of the track sections A, B, C, D, etc., preferably has an independent source of current supply, such as indicated at 6, connected across the rails 2 and 3. Each section of the signal conductor 5 is connected at one end by a conductor 7 with the rail 3 of the track section next in advance of the section in which that particular signal conductor is located. That is to say, the signal conductor 5 for the track section A is connected to the rail 3 of the section B; and the signal conductor 5 of the section B is connected to the track rail 3 of section C, and so on throughout the system.

In these diagrams, the numeral 8 indicates a car axle and wheels, and illustrates a train or other vehicle. Located on this vehicle (in the case of an engine, in the cab thereof), is a relay, which is shown as having two electro-magnets 9 and two connected armatures 10 and 11. The two magnets 9 are shown as connected in series, one terminal being electrically connected to an axle of the engine by a conductor, such as indicated at 9ª, and the other terminal being connected by a conductor 12 to the contact shoe 13, which is carried by the vehicle and is arranged to contact with the sectional signal conductor 5. This contact shoe is preferably arranged so as to be raised and lowered into and out of contact with the rail 5; and for this purpose I have shown an actuating cylinder 14 which is connected by pipes 14ª with a pipe 15, which is connected with the usual air reservoir of the brake system, a valve 16 being provided whereby air can be admitted from the pipe 15 through either pipe 14ª to effect the raising or lowering of the shoe 13.

17 designates an air brake pipe, forming a branch of the usual air brake system, and preferably leading from the equalizing chamber of the said system. This pipe has an escape valve 18. Secured to the stem of this valve is a counter-weighted lever 19 having a pivoted end section 20 which is adapted for engagement with a catch 21 of the armature 22 of a pair of electro-magnets 23. These magnets 23 form part of a local circuit 24, which includes a battery or other source of energy 25, the circuit 24 being completed through the armature 10 and its contact 10ª.

26 is another electro-magnet, which is connected in multiple with the magnets 23, its circuit 27 being completed through the armature 11 and its contact 11ª. The magnet 26 is a solenoid magnet, the plunger of which has a connection 28 with the actuating-crank 29 of a semaphore or other signal 30. 31 designates a whistle or other audible alarm arranged to be sounded by the escape of air from the pipe 17. 32 is the engineer's brake control valve. This valve is provided with a contact 33, which is adapted, in a certain position of the valve handle 34, to bridge two contacts 35. One of these contacts is connected to the conductor 24, and the other to the battery 25, so that when they are bridged by the contact 33 the circuit of the magnets 23 is completed independently of the armature 11.

The operation is as follows:—Supposing the train to be in the block section B, as illustrated in Fig. 1, the magnets 9 are energized by current in the closed circuit which comprises the section of the conductor 5 located in the block B, the conductors 9ª and 12, the car wheels and axle 8, and the track rails, the current supplying this circuit being derived from the source 6, which is connected across the rails of the blocks C. So long, therefore, as the block C is clear, the magnets 9 remain energized and the armatures 10 and 11 are closed against their respective contacts 10ª and 11ª. This holds the circuits of the magnets 23 and 26 also closed. Should anything happen to cause a short circuit or open circuit in the block C, the section of the signal conductor 5 with which the contact shoe 13 is in contact will be deprived of its current, the magnets 9 will be deënergized, and the falling of the armatures 10 and 11 away from the contacts 10ª and 11ª will open the circuits of the magnets 23 and 26. The deënergization of the magnets 23 will cause the armature 22 to drop and thereby release the weighted lever 19 of the brake controlling valve 18, and the weight will at once operate to open said valve, thereby releasing air from the pipe 17, sounding the whistle 31 and causing the application of the brakes to the train. The deënergization of the magnet 26 operates the connection 28 to raise the semaphore 30 from the position shown in full lines to the position shown in dotted lines in Fig. 3.

The conditions which will effect the operations just described are illustrated diagrammatically in Fig. 2, where the vehicle 8 is represented as having advanced into the block section C, and a second vehicle 36 is shown as occupying the block section D, and short-circuiting the current which would otherwise be supplied to the signal conductor for the block C. By comparison of Figs. 1 and 2 it will readily be seen that the vehicle 36 will in no way affect the circuits controlling the train apparatus until train 8 has advanced into the block C, or the train 36 has advanced into the block C. It will also be obvious that not only will the presence of another train in the block next in advance of the block occupied by the train 8 effect the operations above described, but similar operations will also be effected by any other condition in the track section in advance which will short-circuit or open-circuit the supply of current to the signal conductor in the preceding block. When the brake valve 18 has been opened in the manner above described, if the engineer does nothing, the train will be automatically brought to a full stop by the application of the brakes. To prevent this, the engineer will move the valve 32 to a position in which the contact 33 will bridge the contacts 35, and will at the same time raise the valve lever 19 to close the valve 18. When the contacts 35 are bridged by the contact 33, the magnets 23 will be reënergized by current from the battery 25, and the armature 22 will be attracted to hold the valve 18 closed. This position of the valve 32 is, however, a slow-speed position, and the engineer cannot move this valve to full speed without breaking the circuit between the contacts 35 and again deënergizing the magnets 23 and again opening the valve 18. He is, therefore, obliged to run his train under full control until the cause of the indicated condition in the next block has been ascertained and removed.

The only way in which it is possible for the engineer to run at full speed after receiving a signal in the manner described is by manually holding the weighted lever 19 in position to hold the valve 18 closed, and this, of course, would not be attempted, particularly if some record indicating device be provided which will automatically indicate the operations of the valve 18.

The system above described is extremely simple. There is no expensive apparatus along the track, and no apparatus exposed along the track which can be injured or affected by weather conditions. The mechanism upon the cab is simple and positive in character, and is protected by its location on the cab from being affected by the weather. It will be noted that the local circuit on the cab is a normally closed circuit, and that anything which may happen to cause the breaking or short-circuiting of this circuit will at once set the semaphore to danger and open the brake-applying valve. It will also be noted that the track circuit for each block is a closed circuit only so long as the train occupies that block. This obviates the necessity for keeping the track rails energized by signaling current throughout the entire length of road, and requires the use of a minimum amount of signaling current.

While I have shown the signal conductors 5 as extending continuously throughout the length of the respective blocks, it will be obvious that these conductors may extend for only a portion of the length of the respective blocks, in which case the engineer will of course receive a signal only when the train is over that portion of a block along which the signal conductor extends, which portion will, of course, always be so located as to cause the conductor to receive a signal sufficiently at a safe point within the block.

In Fig. 1 I have also shown means whereby a semaphore or other signal along the track may also be operated. This is shown as being effected by a relay 40 connected across the track rails, and controlling a signal 41. I have shown the relay 40 as connected across the distant end of block C; but it will be understood that if desired, a similar relay and signal may be provided for each block. In the arrangement shown the relay 40 may be of much higher resistance than the relay 9, so that as soon as the vehicle 8 enters the track section B, sufficient current will be shunted away from the relay 40 to cause its armature to drop. This may, however, be accomplished in various other ways.

What I claim is:—

1. In a system of the character described, a relay mounted on the vehicle, a track circuit and connections for controlling the relay, a normally closed local circuit controlled by the relay, an electro-magnet in said local circuit, a brake valve normally held in closed position by the magnet, means for automatically opening the valve when the magnet is deënergized, a brake valve and contacts controlled by said valve for closing the circuit of said magnet independently of the relay, said contacts being so arranged that the circuit of the magnets can only be closed thereby when the last named brake valve is in a low-speed position; substantially as described.

2. In a system of the character described, a brake valve located on the vehicle, a magnet for normally holding the brake valve closed, means for automatically opening said valve when the magnet is deënergized, a track circuit for controlling the magnet, a brake valve, and contacts controlled by said valve for closing the circuit of said magnet, said contacts being so arranged that the circuit of the magnet can be closed thereby only when the last named valve is in a low-speed position; substantially as described.

In testimony whereof, I have hereunto set my hand.

THOMAS M. FREEBLE.

Witnesses:
A. D. KAUFMANN,
CORA B. LYNCH.